Nov. 8, 1949
D. J. PARRIS
2,487,582
ARC SOLDERING IRON
Filed Dec. 12, 1946
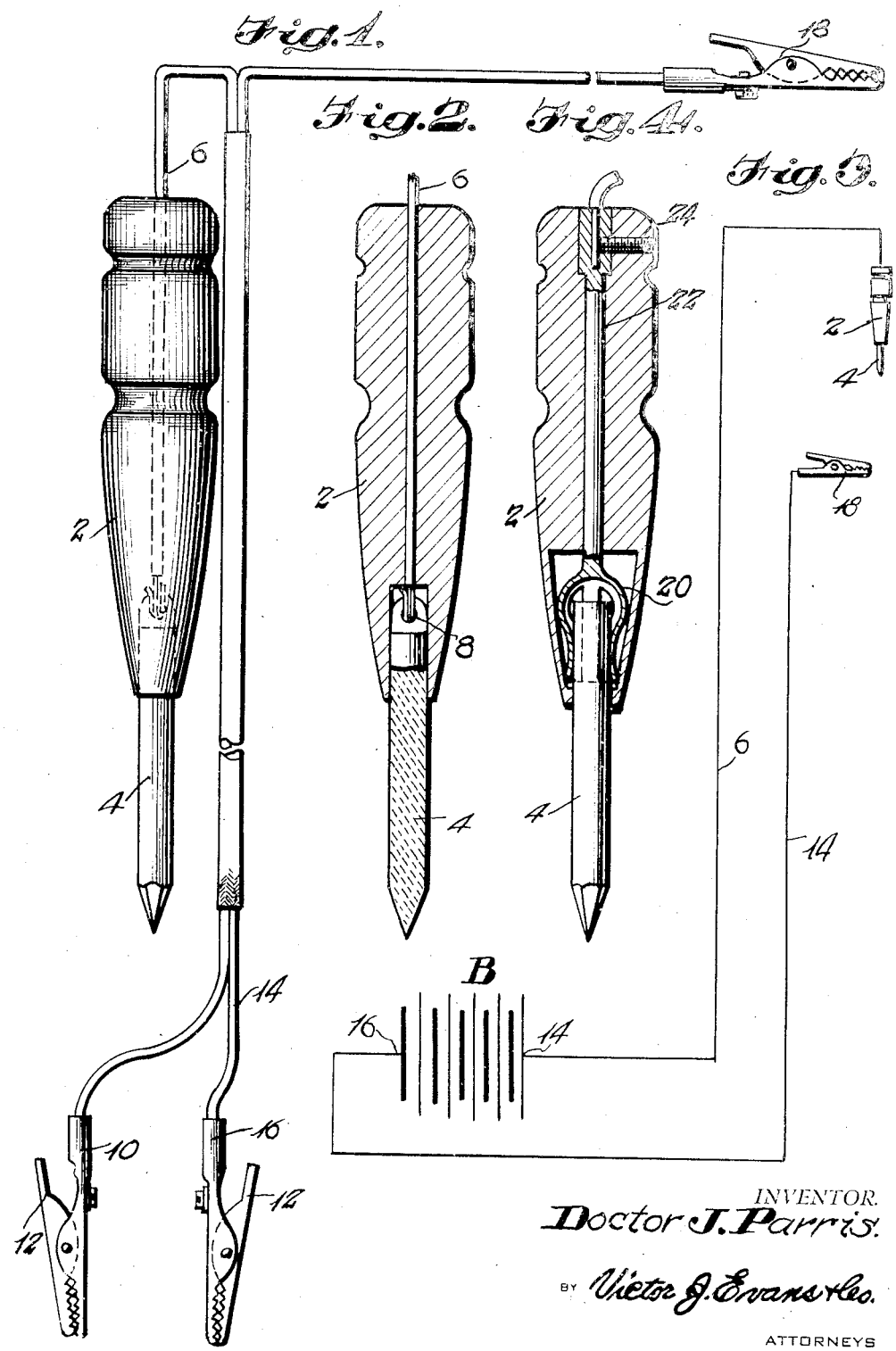
INVENTOR.
Doctor J. Parris.
BY Victor J. Evans & Co.
ATTORNEYS Patented Nov. 8, 1949

2,487,582

UNITED STATES PATENT OFFICE 2,487,582

ARC SOLDERING IRON

Doctor J. Parris, Gaffney, S. C.

Application December 12, 1946, Serial No. 715,694

1 Claim. (Cl. 219—26)

My present invention relates to an improved arc soldering iron of the type designed for connection in a circuit to a source of electrical current so that the iron, a part of the circuit may arc with the work thus creating sufficient heat to melt the solder and cause the adherence of the melted solder with the work.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Figure 1 is a plan view of the iron and the connecting clips therefor.

Figure 2 is a vertical sectional view through the iron.

Figure 3 is a diagrammatic view of the electrical circuit involved.

Figure 4 is a vertical sectional view of a modified structure.

Referring now to the drawings I employ a handle 2 for the soldering electrode 4 of suitable metal secured to wire 6 through hole 8. Clip 10 having a spring lever 12 is secured to the other end of the wire 6. Wire 14 has clips 16 and 18 similar to clip 10 at the ends thereof.

In use the clip 10 is secured to one terminal of battery B. The clip 16 is attached to the other terminal and clip 18 is attached to the work.

Thus when the electrode 4 is contacted with the work an arc is created of sufficient heat to melt the solder.

In Fig. 4 I have shown the electrode 4 enclosed in the prongs 20 of conductor 22 in the handle secured by screw 24 and connected to wire 6.

The soldering iron of my invention is simple in construction and use and will avoid the need for heating the iron before use with the attendant difficulties in keeping the iron hot and dispensing with the need for equipment.

The iron may be used by the most inexperienced person without danger and with assured success.

Having thus fully described my invention what I claim as new and desire to secure by Letters Patent is:

An arc soldering iron including a handle having a truncated conical shaped recess in one end thereof, and a circular bore in the opposite end thereof, a second bore in the handle longitudinally thereof connecting said first bore and said recess, a conductor in the second bore of the handle having an enlargement on one end thereof adapted to be received in said first bore and angularly curved resilient prongs at the opposite end thereof positioned in the recess, an electrode adapted to enter said recess and to be removably secured in the prongs and extending beyond the end of the handle, a screw extending into the handle and the enlargement on the conductor to engage means entering said enlargement for connecting said electrode in an electric circuit whereby the electrode and the work in the circuit will create an arc for melting the solder.

DOCTOR J. PARRIS.

REFERENCES CITED

The following references are of record in the file of this patent:

UNITED STATES PATENTS

| Number | Name | Date |
| --- | --- | --- |
| 1,200,810 | Clemens | Oct. 10, 1916 |
| 1,550,878 | Charleston et al. | Aug. 25, 1925 |
| 1,573,925 | Franke et al. | Feb. 23, 1926 |
| 2,014,728 | Forney | Sept. 17, 1935 |
| 2,422,265 | Squires | June 17, 1947 |

FOREIGN PATENTS

| Number | Country | Date |
| --- | --- | --- |
| 577,791 | France | Sept. 10, 1924 |